US012174927B2

(12) United States Patent
Ghannam et al.

(10) Patent No.: US 12,174,927 B2
(45) Date of Patent: Dec. 24, 2024

(54) BLOCKCHAIN METHOD AND SYSTEM TO PREVENT CAMERA SPOOFING BEFORE OPERATING VEHICLE

(71) Applicant: Ford Global Technologies, LLC, Dearborn, MI (US)

(72) Inventors: Mahmoud Yousef Ghannam, Canton, MI (US); Brian Bennie, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 281 days.

(21) Appl. No.: 17/659,860

(22) Filed: Apr. 20, 2022

(65) Prior Publication Data

US 2023/0342441 A1    Oct. 26, 2023

(51) Int. Cl.
G06F 21/32      (2013.01)
B60R 25/01      (2013.01)
B60R 25/30      (2013.01)

(52) U.S. Cl.
CPC .............. *G06F 21/32* (2013.01); *B60R 25/01* (2013.01); *B60R 25/30* (2013.01)

(58) Field of Classification Search
CPC ........ G06F 21/32; H04W 12/00; B60R 25/01; B60R 25/1001; B60R 25/1004
See application file for complete search history.

(56) References Cited

U.S. PATENT DOCUMENTS 11,524,656 B2 * 12/2022 Yorke ..................... B60R 25/24
11,738,659 B2 *  8/2023 Penilla ................. G06Q 20/326
                                              320/109

(Continued)

FOREIGN PATENT DOCUMENTS

KR      1020210153248 A    12/2021
WO      WO-2019172905 A1 *  9/2019 ......... B60R 25/2018
WO         2020205597 A1    10/2020

OTHER PUBLICATIONS

Sara Technologies Inc., Blockchain Integration With Facial Recognition, Blockchain Integration with Facial Recognition, Medium, Jan. 17, 2022.

*Primary Examiner* — Daniel B Potratz
*Assistant Examiner* — Faghia Telat Rana
(74) *Attorney, Agent, or Firm* — Frank Lollo; Eversheds Sutherland (US) LLP

(57) ABSTRACT

The disclosure is generally directed to systems and methods for detecting presence of a potential user of a vehicle, validating the potential user with a permissioned blockchain with a plurality of predefined nodes through a consensus among the predefined nodes, determining a level of authentication for the potential user according to the consensus and allowing the potential user to enter the vehicle and denying access to predetermined vehicle systems if the consensus fails to provide the level of authentication above a predefined percentage. The initializing the authentication based on detected presence of the potential user includes detecting the potential user with an exterior sensor coupled to the vehicle and applying the permissioned blockchain to perform facial recognition including performing an initial determination of authentication and requesting confirmation of the initial determination from at least one of the plurality of 63 predefined nodes.

15 Claims, 14 Drawing Sheets

(56) References Cited

U.S. PATENT DOCUMENTS

| | | | |
|---|---|---|---|
| 2019/0016281 A1* | 1/2019 | Liu | .................... B60R 25/257 |
| 2020/0074061 A1 | 3/2020 | Kim | |
| 2020/0233940 A1* | 7/2020 | Edwards | ............... H04L 9/0637 |
| 2020/0238952 A1 | 7/2020 | Lindsay et al. | |
| 2023/0286463 A1* | 9/2023 | Matsuzawa | ............. B60R 25/31 |

* cited by examiner

BLOCKCHAIN METHOD AND SYSTEM TO PREVENT CAMERA SPOOFING BEFORE OPERATING VEHICLE

FIELD OF THE DISCLOSURE

This disclosure generally relates to vehicles, and more particularly relates to systems and methods for preventing sensor spoofing.

BACKGROUND

Current facial recognition techniques associated with vehicle operation are vulnerable to spoofing. Spoofing may include using a photograph to fool a facial recognition system or altering an appearance with glasses or the like. Facial recognition capability may be degraded due to sensor functionality issues such as weather conditions and camera health.

It is desirable to provide solutions that prevent access to vehicles through spoofing.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
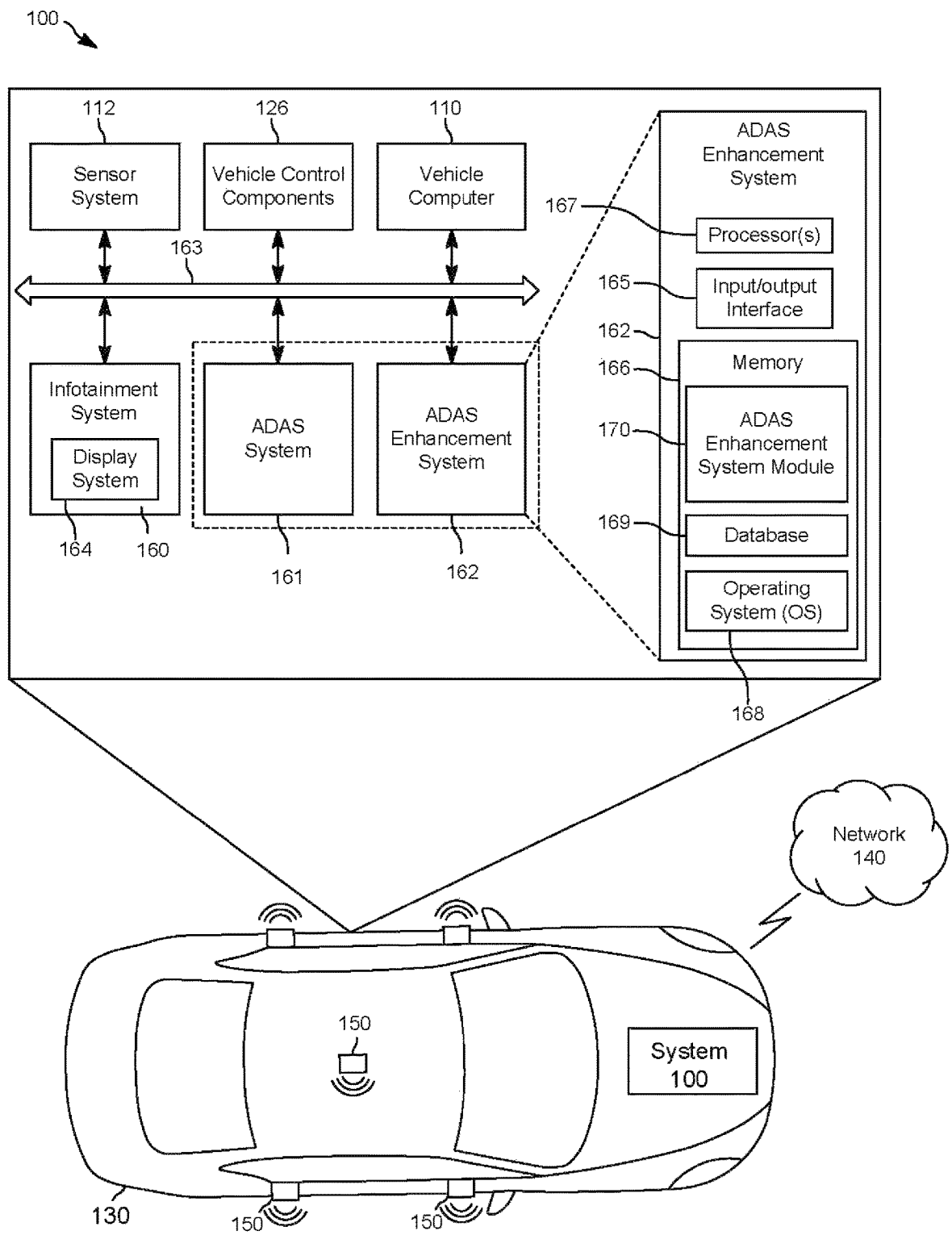
FIG. 1 illustrates an example system that includes a vehicle configured with sensors in accordance with an embodiment of the disclosure.

In terms of a general overview, this disclosure is generally directed to systems and methods for. An example method includes detecting a presence of a potential user of a vehicle, validating the potential user with a permissioned blockchain through a plurality of predefined nodes based on a consensus among the plurality of predefined nodes, determining a level of authentication for the potential user according to the consensus; and allowing the potential user to enter the vehicle and denying access to predetermined vehicle systems if the consensus fails to provide the level of authentication above a predefined percentage. The determining the level of authentication includes determining whether to allow the potential user to enter the vehicle, operate the vehicle and operate vehicle equipment, the level of authentication as a function of the consensus.

The initializing the authentication based on the detected presence of the potential user includes detecting the potential user with an exterior sensor coupled to the vehicle, applying the permissioned blockchain to perform facial recognition including performing an initial determination and requesting confirmation of the initial determination from at least one of the plurality of predefined nodes.

In one or more embodiments, the method includes determining that one of the plurality of predefined nodes rejected the potential user, requesting a higher level of authentication to prevent spoofing by requiring at least one of a voice recognition, a sensor image of the potential user, a user-related query, a biological evaluation of the user, an occupant sensing, and a thermal imaging, and permitting the potential user to access the vehicle and vehicle systems if the higher level of authentication successfully identifies the potential user.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternative implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

It should also be understood that the word "example" as used herein is intended to be non-exclusionary and non-limiting in nature. Furthermore, certain words and phrases that are used herein should be interpreted as referring to various objects and actions that are generally understood in various forms and equivalencies by persons of ordinary skill in the art. For example, the word "application" or the phrase "software application" as used herein with respect to a mobile device such as a smartphone, refers to code (software code, typically) that is installed in the mobile device. The code may be launched and operated via a human machine interface (HMI) such as a touchscreen. The word "action" may be used interchangeably with words such as "operation" and "maneuver" in the disclosure. The word "maneuvering" may be used interchangeably with the word "controlling" in some instances. The word "vehicle" as used in this disclosure can pertain to any one of various types of vehicles such as cars, vans, sports utility vehicles, trucks, electric vehicles, gasoline vehicles, hybrid vehicles, and autonomous vehicles. Phrases such as "automated vehicle," "autonomous vehicle," and "partially-autonomous vehicle" as used in this disclosure generally refer to a vehicle that can perform at least some operations without a driver being seated in the vehicle.

FIG. 1 illustrates an example system 100 that includes a vehicle 101 that may be one of various types of vehicles such as a gasoline-powered vehicle, an electrified vehicle, a hybrid electrified vehicle, or an autonomous vehicle, that is configured as an automated or semi-automated vehicle. The vehicle 101 may be implemented in a variety of ways and can include some components that are a part of the vehicle 101, and, in some embodiments, other components that are accessible via a communications network 140. The components that can be a part of vehicle 101 can include computer 110 with a processor 102 and a memory 104 in communication with network 140. Memory 104 includes one or more forms of computer-readable media, and stores instructions executable by the computer 110 for performing various operations, including as disclosed herein.

The computer 110 may operate vehicle 101 in an autonomous, a semi-autonomous mode, or a non-autonomous (manual) mode. For purposes of this disclosure, an autonomous mode is defined as one in which each of vehicle 101 propulsion, braking, and steering are controlled by the computer 110; in a semi-autonomous mode the computer 110 controls one or two of vehicles 101 propulsion, braking, and steering; in a non-autonomous mode a human operator controls each of vehicle 101 propulsion, braking, and steering.

The computer 110 may include programming to operate one or more of vehicle 101 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

Computer 110 may include or be communicatively coupled to, e.g., via the vehicle 101 communications module 130 as described further below, more than one processor, e.g., included in electronic controller units (ECUs) or the like included in the vehicle 101 for monitoring and/or controlling various vehicle components 126, e.g., a powertrain controller, a brake controller, a steering controller, etc. Further, the computer 110 may communicate, via the vehicle 101 communications module 130, with a navigation system that uses the Global Position System (GPS). As an example, the computer 110 may request and receive location data of the vehicle 101. The location data may be in a known form, e.g., geo-coordinates (latitudinal and longitudinal coordinates).

The computer 110 is generally arranged for communications on the vehicle 101 communications module 130 and also with a vehicle 101 internal wired and/or wireless network, e.g., a bus or the like in the vehicle 101 such as a controller area network (CAN) or the like, and/or other wired and/or wireless mechanisms. Computer 110 may transmit messages to various devices in the vehicle 101 and/or receive messages from the various devices, e.g., vehicle sensors 112, actuators 120, vehicle components 126, a human-machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 112 may provide data to the computer 110.

Vehicle sensors 112 may include a variety of devices such as are known to provide data to the computer 110. For example, the vehicle sensors 112 may include Light Detection and Ranging (lidar) sensor(s) 112, etc., disposed on a top of the vehicle 101, behind a vehicle 101 front windshield, around the vehicle 101, etc., that provide relative locations, sizes, and shapes of objects and/or conditions surrounding the vehicle 101. As another example, one or more radar sensors 112 fixed to vehicle 101 bumpers may provide data to provide and range velocity of objects (possibly including second vehicles), etc., relative to the location of the vehicle 101. The vehicle sensors 112 may further include camera sensor(s) 112, e.g., front view, side view, rear view, etc., providing images from a field of view inside and/or outside the vehicle 101.

The vehicle 101 actuators 120 are implemented via circuits, chips, motors, or other electronic and or mechanical components that can actuate various vehicle subsystems in accordance with appropriate control signals as is known. The actuators 120 may be used to control components 126, including braking, acceleration, and steering of a vehicle 101.

In the context of the present disclosure, vehicle components 126 are one or more hardware components adapted to perform a mechanical or electro-mechanical function or operation, such as moving the vehicle 101, slowing or stopping the vehicle 101, steering the vehicle 101, etc. Non-limiting examples of components 126 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications to another vehicle, to (typically via the network 140) a remote server 145. The communication module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communication module 130 include cellular, Bluetooth®, IEEE 802.11, dedicated short-range communications (DSRC), and/or wide area networks (WAN), including the Internet, providing data communication services.

The network 140 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN)

and/or wide area networks (WAN), including the Internet, providing data communication services.

A computer 110 can receive and analyze data from sensors 112 substantially continuously, periodically, and/or when instructed by a server 145, etc. Further, object classification or identification techniques can be used, e.g., in a computer 110 based on lidar sensor, camera sensor, etc., data, to identify a type of object, e.g., vehicle, person, rock, pothole, bicycle, motorcycle, etc., as well as physical features of objects.

The computer 110 may include programming to operate one or more of vehicle 101 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

FIG. 1 further shows some example components that can be included in the vehicle 101 in accordance with an embodiment of the disclosure. The example components can include a sensor system 112, including both internal and external cameras, vehicle control components 126, the vehicle computer 110, infotainment system 160, an Advanced Driver Assistance System (ADAS) 161, and an ADAS enhancement system 162. The various components are communicatively coupled to each other via one or more buses such as an example bus 163. The bus 163 may be implemented using various wired and/or wireless technologies. For example, the bus 163 can be a vehicle bus that uses a controller area network (CAN) bus protocol, a Media Oriented Systems Transport (MOST) bus protocol, and/or a CAN flexible data (CAN-FD) bus protocol. Some or all portions of the bus 163 may also be implemented using wireless technologies such as Bluetooth®, Bluetooth®, Ultra-Wideband, Wi-Fi, Zigbee®, or near-field-communications (NFC). The infotainment system 140 can include a display system 164 having a GUI for carrying out various operations. The GUI may be used, for example, by a driver to input a level of responsiveness for the ADAS 161 to perform an operation.

Sensor system 112 can include various types of sensors such as, for example, a weight sensor, an external and internal camera capable of facial detection, a radar detector, a front-facing camera, and others as shown as 150 on vehicle 130. Vehicle control components 126 can include various components and systems associated with driving functions of the vehicle 101 (such as, for example, the engine, brakes, accelerator, and fuel injection) and various other functions of the vehicle 101 (such as, for example, stocks and struts whose characteristics can be controlled for varying a performance of the vehicle 101). The various components may be controlled, activated, and/or operated by the vehicle computer 110, the ADAS 161, and the ADAS enhancement system 162.

In one implementation, the ADAS enhancement system 162 can be an independent device (enclosed in an enclosure, for example). In another implementation, some or all components of the ADAS enhancement system 162 can be housed, merged, or can share functionality, with the ADAS 161 and/or the vehicle computer 110. For example, an integrated unit that combines the functionality of the ADAS enhancement system 162 with that of the ADAS 161 can be operated by a single processor and a single memory device. In the illustrated example configuration, the ADAS enhancement system 162 includes a processor 167, an input/output interface 165, and a memory 166.

Input/output interface 165 may be configured to provide communications between the ADAS enhancement system 162 and other components such as the sensor system 112 (for receiving weight information from a weight sensor, for example), the vehicle control components 126 (for overriding commands issued by the ADAS 161 and for providing enhanced operations such as, for example, a greater braking distance), the infotainment system 160, and the ADAS 161.

Memory 166, which is one example of a non-transitory computer-readable medium, may be used to store an operating system (OS) 168, a database 169, and various code modules such as an ADAS enhancement system module 170. The code modules are provided in the form of computer-executable instructions that can be executed by the processor 167 for performing various operations in accordance with the disclosure.

The ADAS enhancement system module 170 may be executed by the processor 167 for performing various operations in accordance with the disclosure. Some example operations are described above.

Database 169 may be used to store information such as information that can be accessed and used by the processor 164 when executing the ADAS enhancement system module 170.

The vehicle computer 110, in one or more embodiments, may be used to support features such as passive keyless operations, vehicle maneuvering operations, and vehicle monitoring operations. Vehicle computer 110, in one or more embodiments, may execute certain operations associated with facial recognition to allow entry and operation of vehicle systems such as the ADAS system in accordance with the disclosure.

As shown, sensor system 112 may include a set of sensors 150 mounted upon and within vehicle 130 in a manner that allows the vehicle computer 110 to detect potential users of vehicle 130 both outside vehicle 130 and within vehicle 130. Examples of sensors 150 may include sensors and/or emitters capable of detecting objects, distances such as radar, LiDAR, cameras, and the like. Sensor data may be enhanced with cloud-based network data communicated to vehicle 130, for example to provide potential user data for comparison, such as facial images, data concerning a potential user's location and the like.

The vehicle 130 may connect via the communications network 140 or be connected directly using a cable or the like. The communications network 140 may include any one network, or a combination of networks, such as a local area network (LAN), a wide area network (WAN), a telephone network, a cellular network, a cable network, a wireless network, and/or private/public networks such as the Internet and cloud networks. For example, the communications network 140 may support communication technologies such as TCP/IP, Bluetooth®, cellular, near-field communication (NFC), Wi-Fi, Wi-Fi direct, Li-Fi, acoustic or ultrasonic audio communication, Ultra-Wideband (UWB), machine-to-machine communication, and/or man-to-machine communication. In one or more embodiments, communications network 140 includes a cellular or Wi-Fi communication link, which may include a cloud-based network or source for transferring data in accordance with this disclosure.

Figure 2:
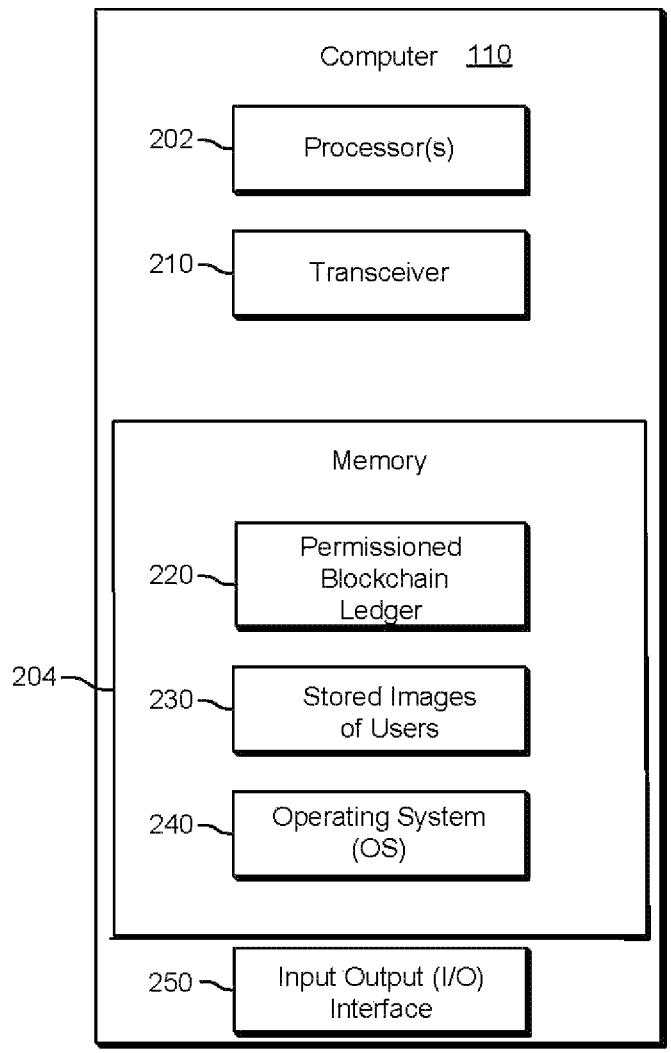
FIG. 2 illustrates some example functional blocks that may be included in a system for a vehicle in accordance with an embodiment of the disclosure.

FIG. 2 illustrates some example functional blocks that may be included in vehicle 130 computer 110 in accordance with an embodiment of the disclosure. The functional blocks of the computer 110 may include a processor 202, transceiver 210, memory 204, permissioned blockchain ledger 220, stored images of users 230 and operating system 240 and I/O interface 250, which may include a touchscreen having softkeys (graphical icons), and a biometric component (to enable facial recognition, a fingerprint scanner, or a microphone for voice command input). The operating system 240 can be any of various kinds of software used for operating the vehicle 130 such as, for example, an iOS® operating system, an Android® operating system, or a Windows® operating system.

Permissioned blockchain ledger 220 may be included as part of a software application. One example of a software application is Ford Pass®.

Figure 3:
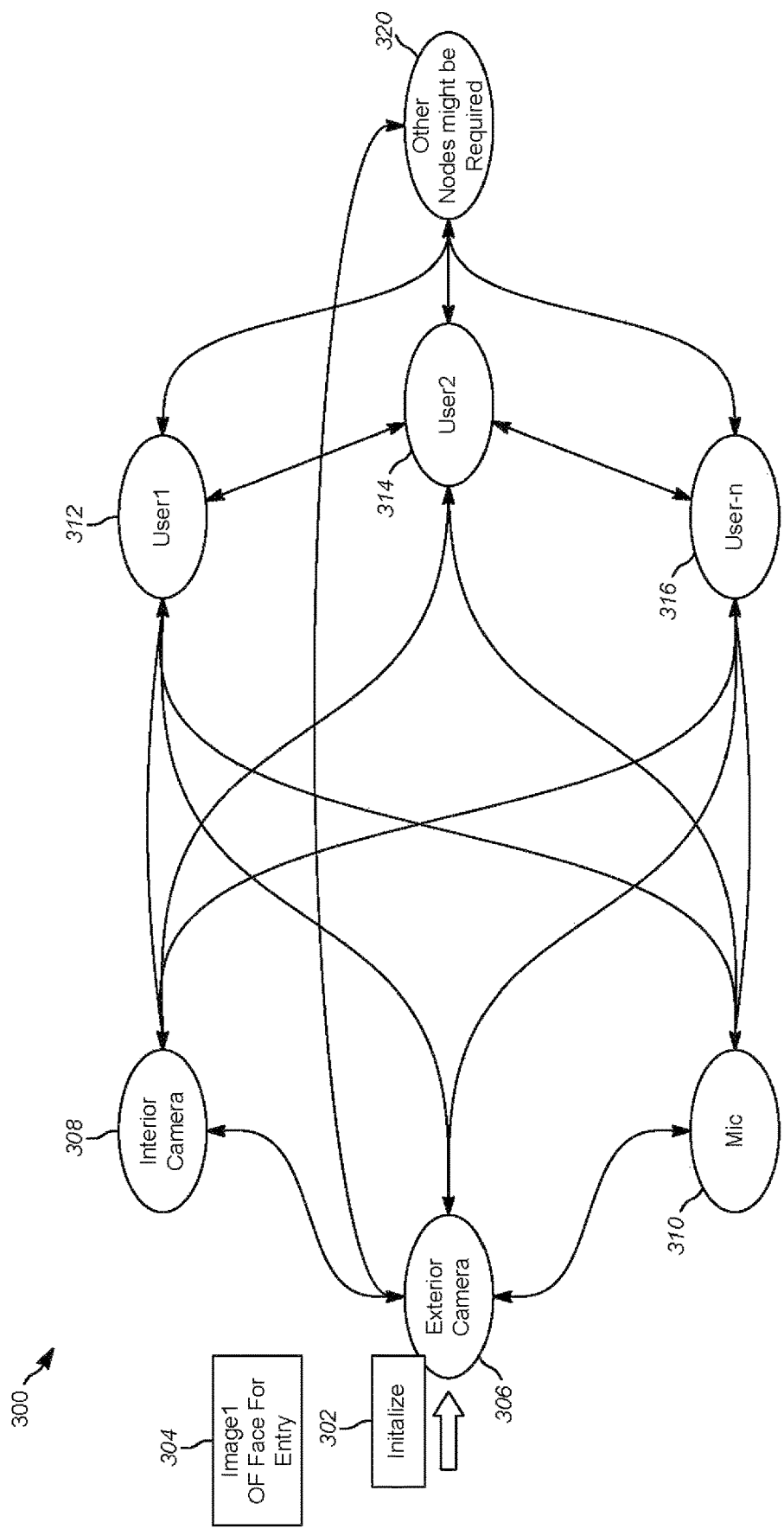
FIG. 3. illustrates an initialization process flow diagram in accordance with an embodiment of the disclosure.

In one or more embodiments, permissioned blockchain ledger 220 operates to control transactions with various nodes such as those illustrated in FIG. 3 that contribute to a blockchain ledger in association with user recognition including facial recognition prior to allowing a user to operate vehicle 130.

The computer 110 in the vehicle 130 may be configured to operate in cooperation with permissioned blockchain ledger 220 to execute various operations associated with in accordance with one or more embodiments.

Referring to FIG. 3, an initialization transaction is illustrated showing how permissioned blockchain ledger operates to consider a potential user of vehicle 130. As shown, initialize 302 includes detecting a potential user's face and comparing the face with an image of a user 304 using an exterior camera 306 or an interior camera 308. In some embodiments, authorization includes contacting a plurality of nodes such as a microphone 310 for voice recognition, user 1 312, user 2 314 or any number of additional users n 316. Thus, each of predefined nodes 306-320 includes exterior and interior sensors, and previously authorized users.

For example, in a first authentication transaction, an exterior camera 306 takes an image of a potential user of vehicle 130 and transmits the image to all nodes available in the blockchain ledger with a request to confirm a relation between image of user 304 and, for example, user 1. The relation provided could be that the image is user 1, that the image is not user 1 or that the image maybe user 1 along with a confidence measure of low, medium or high. This relation is sent as a blockchain transaction to all nodes requesting confirmation from at least another node. In one or more embodiments, the requester, time, date, and location maybe provided with a block for blockchain ledger.

In one or more embodiments, if any node 308-320 is able to confirm the relation, the block is published and the potential user is granted access to vehicle 130.

An example block may appear as:
Trans1-request: Image1=User1;
Trans1-confirm: Image1=User1.

In an alternate scenario, if any node 308-320 is unable to confirm the relation, the block is not published and a relation request is repeated. A higher, second level of authentication may then be asked.

An example block may appear as:
Trans1-request (again): Image1=User1;
Trans1-confirm: Not confirmed???

After any node rejects an image as not being associated with a known user, a spoofing likelihood is evaluated. For example, if exterior camera requests authorization confirmation from nodes 308-320 and the response is that the potential user is not User1, an example block may appear as:

Trans1-request (again): Image1=User1;
Trans1-Confirm: Rejection Image1;
Trans1-request: Further information confirmation are needed.

The higher level of authentication may include voice recognition, a transmission of more images of "Image 1", asking questions related to User1 information, and an evaluation of key biometric segments such as height, width, stand and the like. In one or more embodiments, a confirmation may include known information about User1 regarding location, such as User1 is within car vicinity, User1 is approaching vehicle 130, User1 is at home, work or the like, and User1 matches User1 profile or the like. Stored User1 profile may be located vehicle computer 110 shown in FIG. 2 in memory 204, stored images of users 230 or the like.

Referring to FIGS. 4A-4J, a flow process 400 is shown that describes the permissioned blockchain ledger transactions. More specifically, start 401 begins with a potential user initializing the permissioned blockchain by detecting the presence of a potential user and initializing facial recognition for Image1. Block 402 provides that an exterior camera, such as camera 306 establishes a block with its evaluation to the relation between Image1 and User1. Block 402 leads to three relations, shown as blocks 403, 404 and 405. Block 403 represents a positive entry assessment with a blockchain entry such as Trans1-request: Image1=User1. Block 404 represents a negative entry assessment:

Trans1-request=Image1 not equal to User1.

Block 405 represents a neutral entry assessment with different confidence levels, such as:
Trans1-request: Image1=may be User1 with low confidence;
Trans1-request:Image1=may be User1 with medium confidence; and
Trans1-request: Image1=may be User1 with High confidence.

Referring back to FIG. 4A, positive entry assessment 403 is explained in further detail with reference to FIG. 4B. As shown, block 40302 provides that all nodes start evaluating the request by checking IMage1 versus User1 using the last location of User1 and a time, and checking a history of User1 such as typical places of work, home and leaving times. Coupled to block 40302 are the three possibilities, 40303, 40308, and 40314.

Block 40303 provides that if any node confirmed, then the block will be published. For example, block 40304 illustrates a transaction:

Block1 Trans1-request: Image1=User1;
Trans1-confirm: Image1=User1.

Block 40305 provides that access to vehicle 130 will be allowed. Block 40306 proves that all nodes update their ledgers. Turning to FIG. 4C, Block 40307 provides that when vehicle 130 stops and a driver leaves, another transaction will be transmitted to and confirmed, and published similarly to update vehicle 130 location and time and the driver's location and time. Such information may be used for a next facial recognition.

Block 40308 represent if no node confirmed and prevents the block from being published. Block 40309 represents Block1:

Trans1-request(again): Image1=User1;
Trans1-confirm: Not confirmed???.

Block 40310 provides that access to vehicle 130 will not be allowed. Block 40311 provides for repeating the request at least one more time. Block 40312 provides for a second, higher level of authentication as being required. Exterior camera 306 may capture more images and evaluate them. Exterior camera 306 may also capture other biometrics such as "KeyBioSegments" including height, width, stand and the like.

As will be appreciated by one of skill in the art, biometrics can include more than height, width, and stand of a potential user, but can include fingerprints, voice recognition, eye matching, and the like.

Block 40314 provides that if any node rejected the relation and sent that Image1 is not User1 that there could be a spoofing case. Block 40315 provides for a negative entry:
block1: Trans-request (again): Image1=User1;
Trans1-Confirm: Negative Image1 not equal to User1.

Block 40316 provides for not opening the vehicle 130 door. Block 40317 prevents access and requesting a higher level of authentication. For example, voice recognition, sending more images of Image1, asking questions related to User1 information and evaluation of other biometrics such as "KeyBioSegments" like height, width, stand and the like.

Figure 4A:
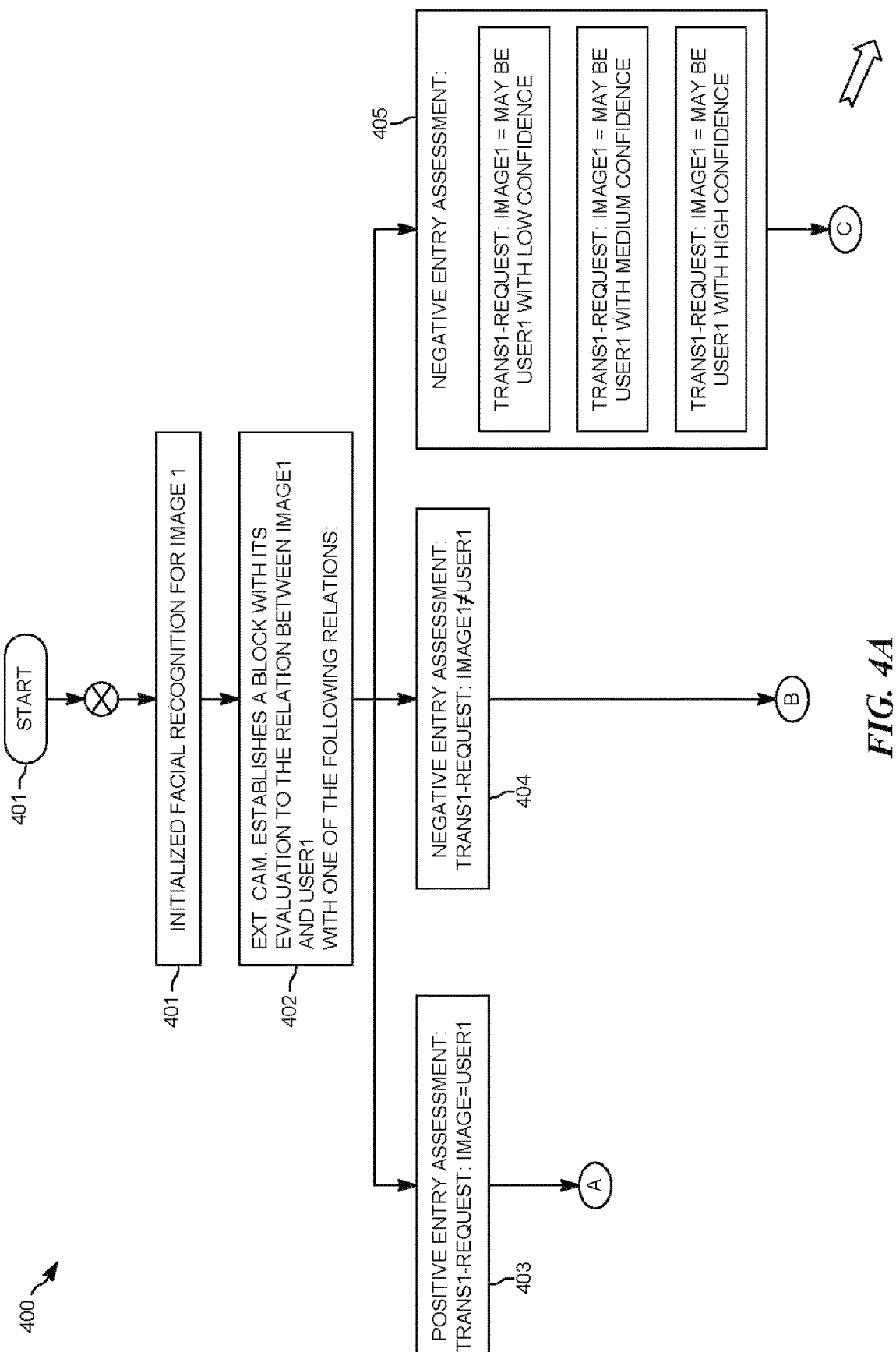
FIGS. 4A, 4B, 4C, 4D, 4E, 4F, 4G, 4H, 4I, and 4J illustrate a process flow for blockchain transactions in accordance with an embodiment of the disclosure.
Figure 4B:
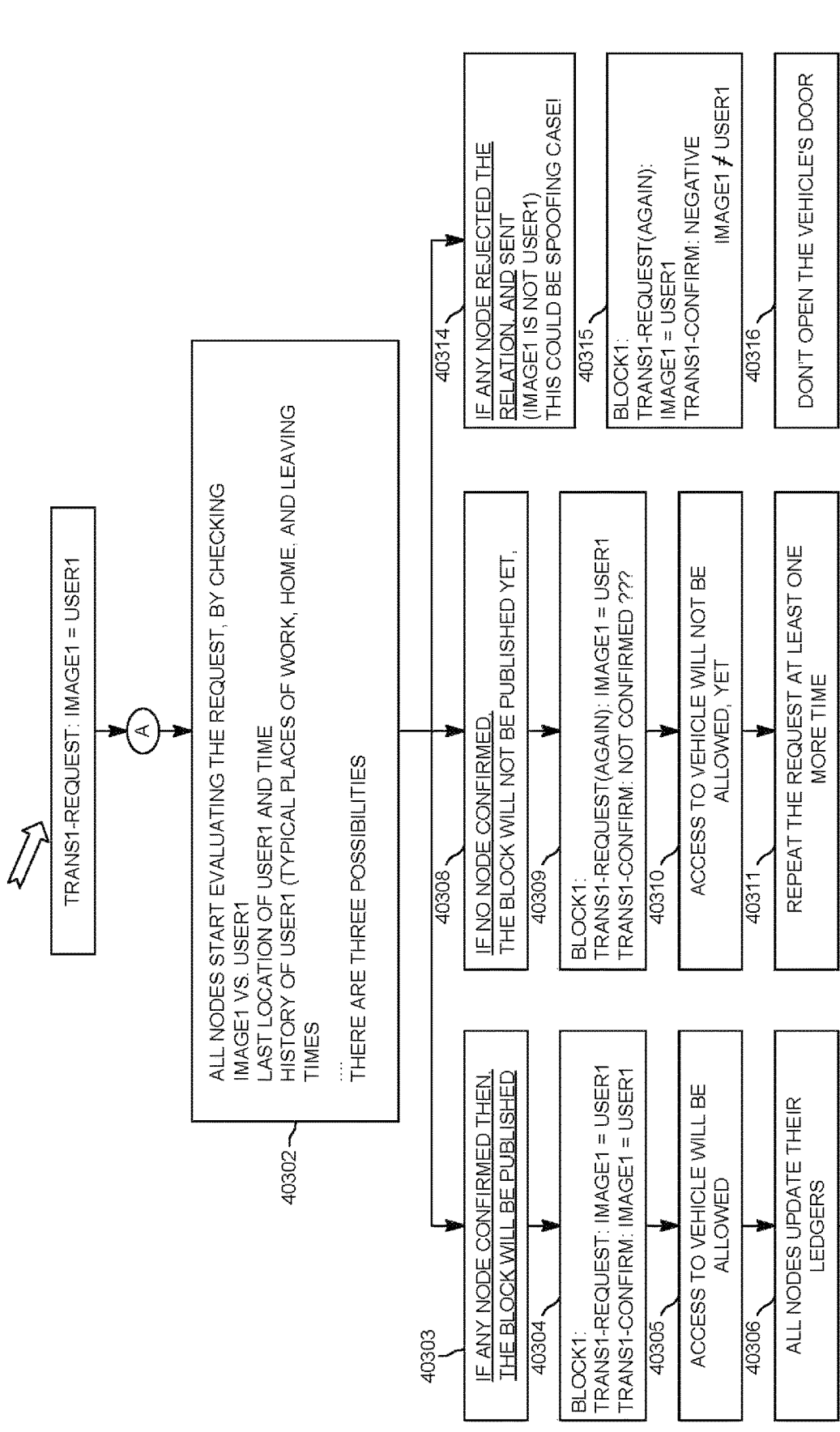
Figure 4C:
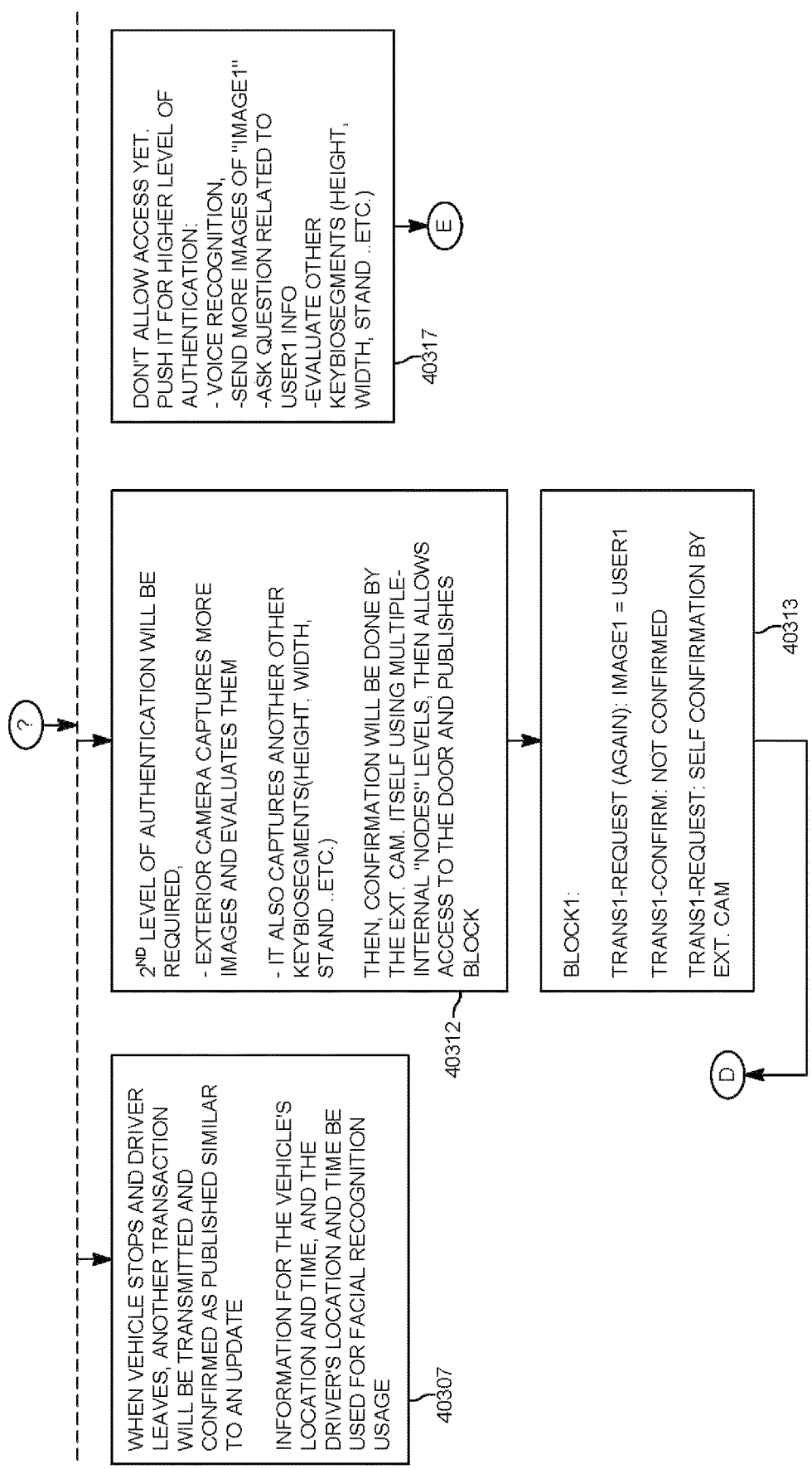
Figure 4D:
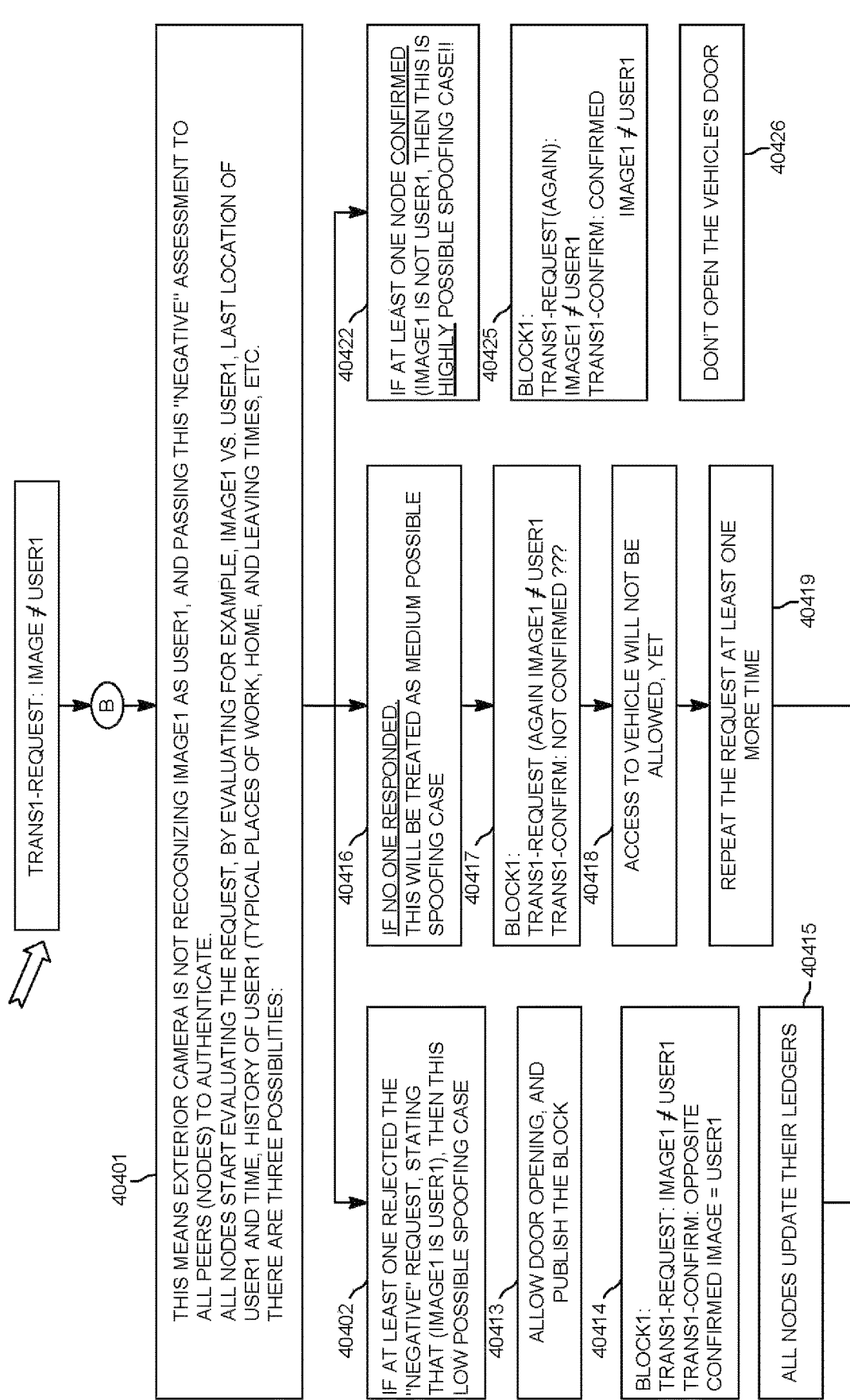

Turning to FIG. 4D, block 404 is explained in further detail. As shown, block 40401 provides for external camera 306 not recognizing Image1 as User1 and passing this "negative" assessment to all peers, such as nodes 308-320 shown in FIG. 3 to authenticate. All nodes start evaluating the request by evaluating, for example, Image1 versus User1, a last location of User1 and a time, a history of User1 such as typical places of work, home and leaving times.

There are three possibilities illustrated shown as block 40402, 40416 and 40424. Block 40402 provides that if at last one rejected the negative request, stating that Imag1=User1, then there is a low possibility of spoofing. Next, vehicle 130 will allow a door to open and publish the block shown in block 40414:
Block1: Trans1-requestion: Image1 not equal to User1;
Trans1-confirm: Opposite confirmed Image1=User1.

Block 40415 provides that all nodes update their ledgers in the permissioned blockchain ledgers., the process flows to block 407

Block 40416 provides that if no nodes responded there will be a medium possibility of spoofing. Block 40417 provides:
Block1: Trans1-request (again Image1 not equal to User1;
Trans1-confirm: Not confirmed???

Block 40418 provides that access to vehicle 130 will not be allowed yet. Block 40419 provides for repeating the request at least one more time. Block 40420 provides for a second higher level of authentication with exterior camera 306 capturing more images and evaluating them and also capturing other biometric data "KeyBioSegments" such as height, width, stand and the like.

Next, confirmation will be done by the external camera 306 using multiple-internal node levels. For example, block 40421 exemplary block could be:
Block1: Trans1-request (again) Image1 not equal to User1;
Trans1-confirm: Not confirmed;
Trans1-request: Self Confirmation by external camera.

After block 40421, block 40422 or block 40423 apply. Block 40422 provides that if the second evaluation shows low confidence that Image1 is not User1, then proceed to block 407. Block 40423 provides that if the second, higher level of evaluation shows higher confidence that Image1 is not User1, then proceed to block 408.

Figure 4E:
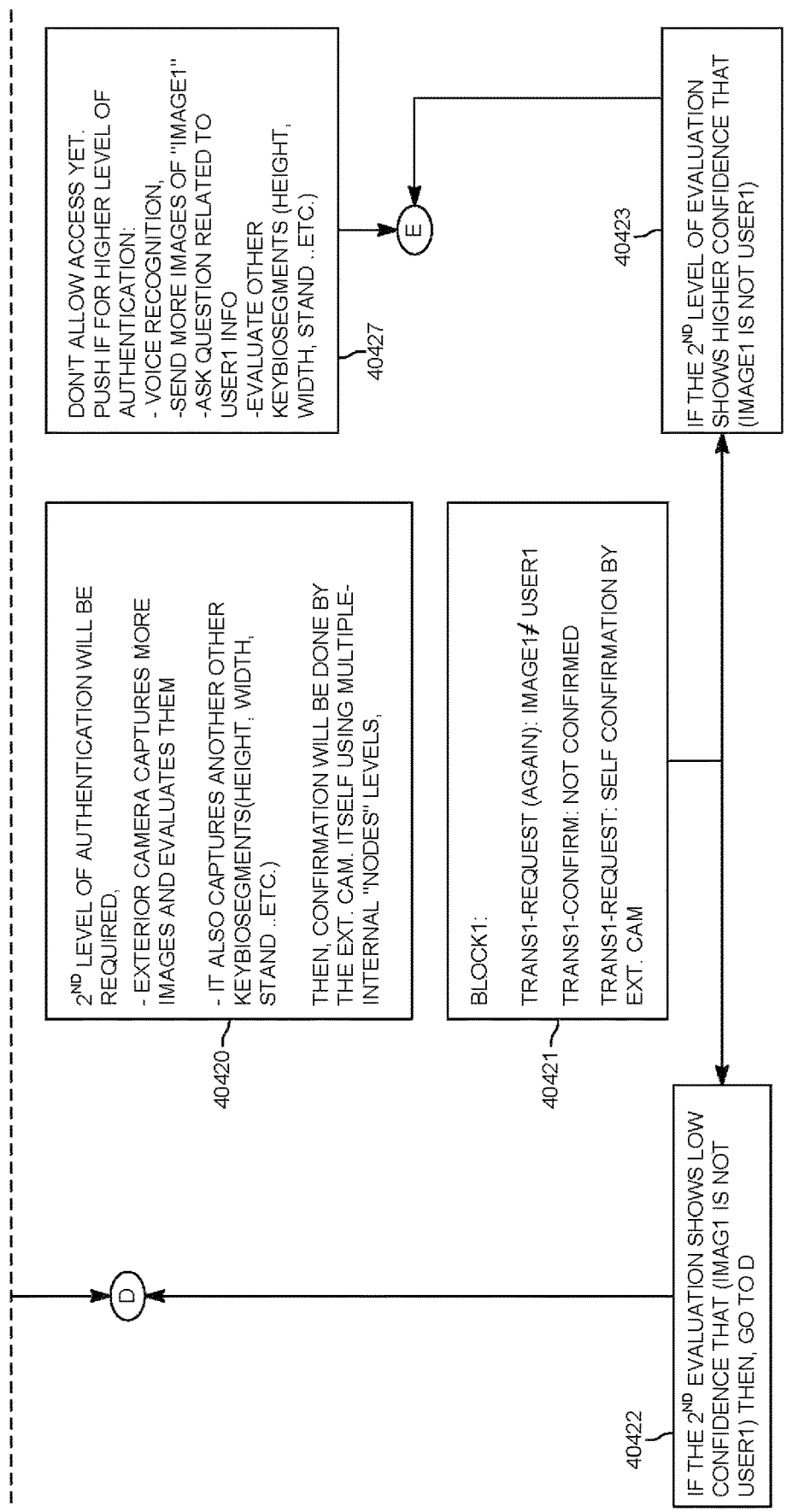

Referring to FIG. 4E, block 405 of FIG. 4 is continued. As shown, block 40501 provides for exterior camera 306 not doubting its assessment. It publishes the assessment with the recognizing Image1 as User1 and passing this "Negative" assessment to all peers (nodes) to authenticate. All nodes start evaluating the request, by evaluating, for example, Image1 versus User1, a last location of User1 and a time. The history of User1 such as typical places of work, home, and leaving times. There are three possibilities illustrated as blocks 40502, 40506, and 40514. Block 40502 provides that at least one rejected the "negative" request, and states that Image1 is User1, then this is a low possible spoofing case. Next in block 40503 the vehicle 130 door is allowed to open doors of vehicle 130 and the block is published in the permissioned blockchain ledger. Block 40504 illustrates an example:
Block 1: Trans1-request: Image1 not equal User1;
Trans1-confirm: opposite confirmed, Image1=User1.

At 40505, all nodes update their ledgers and the process continues to block 40506 wherein, if no nodes respond, a medium possible spoofing case is likely. Block 40507 illustrates that:
Block 1: Trans-request (again Image1 not equal User1;
Trans1-confirm: Not confirmed ??.

Block 40508 provides that access to vehicle 130 will not yet be allowed. Block 40509 provides for repeating the request at least one more time. +

Figure 4F:
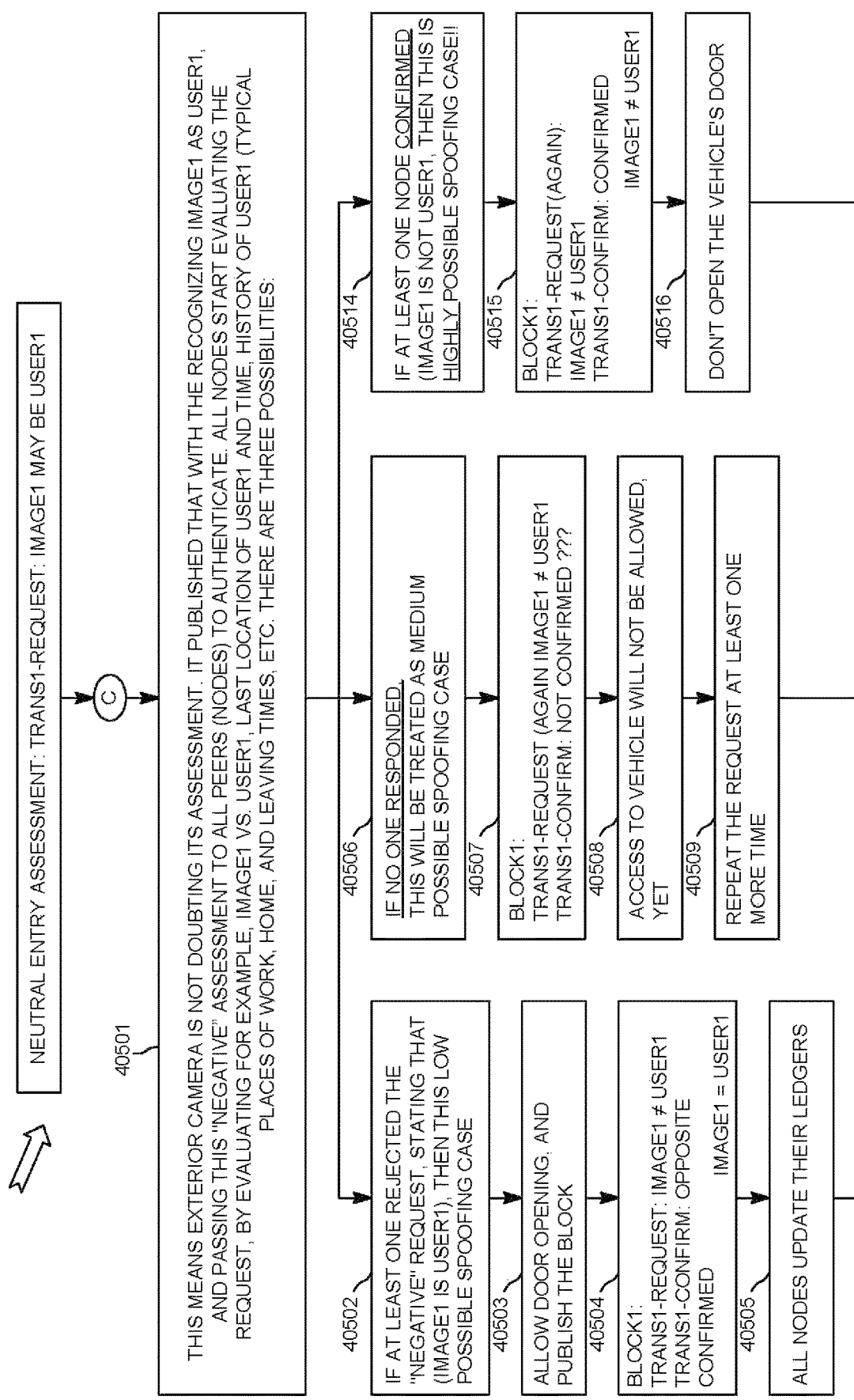
Figure 4G:
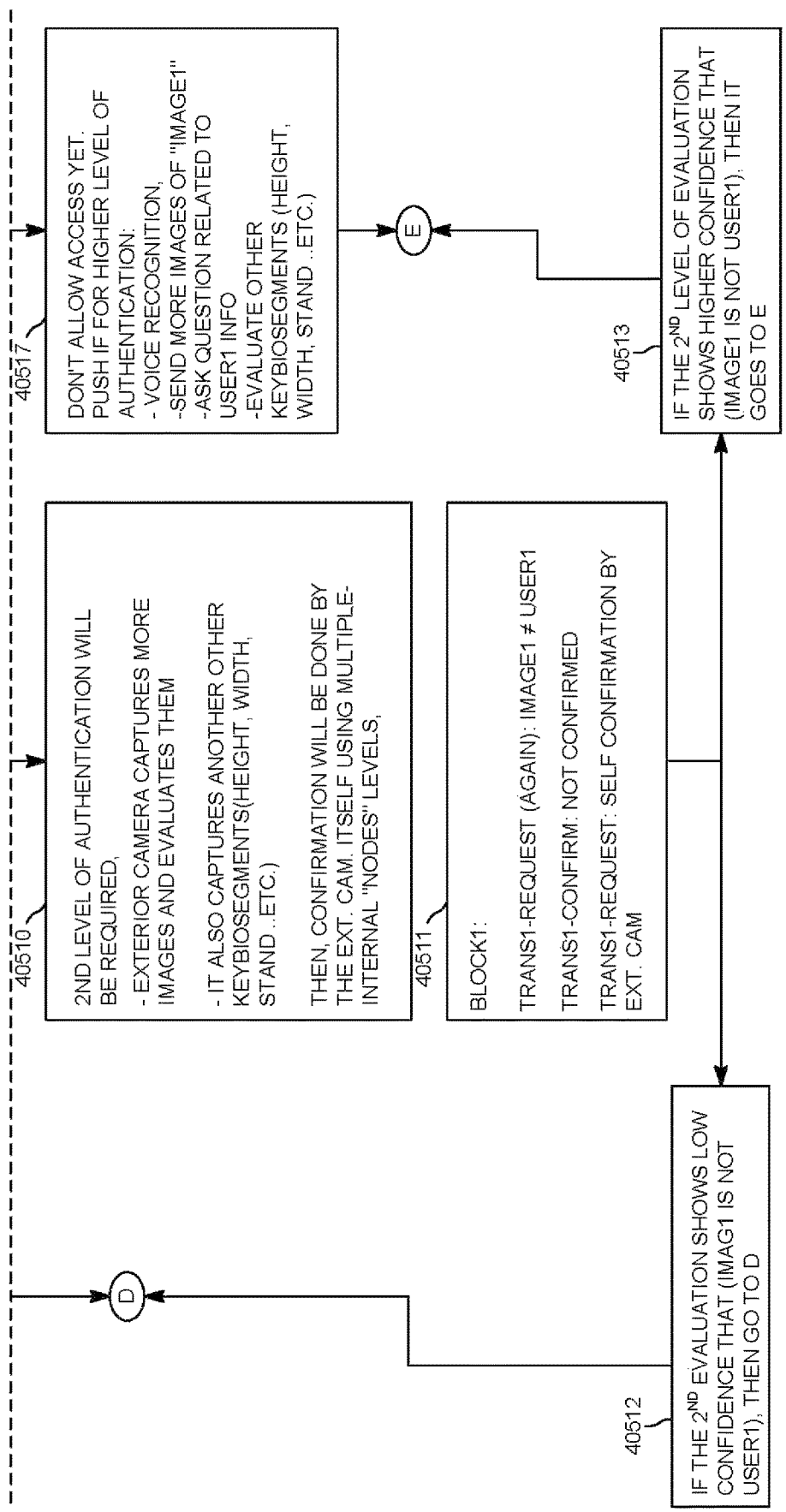

Turning to FIG. 4G, Block 40510 provides for a higher, such as a second level of authentication with exterior camera 130 capturing more images and evaluating them and also capturing biometric data "KeyBioSegments" such as height, width, stand and the like. Next, the confirmation is done by an external camera 306 using multiple-internal node level.

Block 40511 provides for:
Block1: trans-request (again): Image1 not equal to User1;
Trans1-confirm: Not confirmed;
Trans-request: Self Confirmation by external camera 306.

Next, block 40512 and 40513 provide that if the send evaluation shows a low confidence that Image1 is not User1 than proceed to block 407. Block 40513 provides that if the second level of evaluation shows higher confidence that Image1 is not User1 then the process goes to block 408.

Turning to FIG. 4F, Block 40514 provides that if at least one node confirms Image1 is not User1 then there is high probability of spoofing. Block 40515 provides:
Block1: Trans1-request (again): Image1 not equal to User1;
Trans1-Confirm: Confirmed Image1 not equal to User1.

Next, block 40516 provides that permissioned blockchain does not open the vehicle door.

Continuing the process in FIG. 4G, Block 40517 provides that no access is allowed but push for higher level of authentication. For example, voice recognition, sending of more images of Image1, from an authorized node, which could be a mobile authorized device, and asking question of the potential user related to User11 information, and evaluating other biometric data "KeyBioSegments" such as height, width, stand and the like. Next the process proceeds to block 408.

Figure 4H:
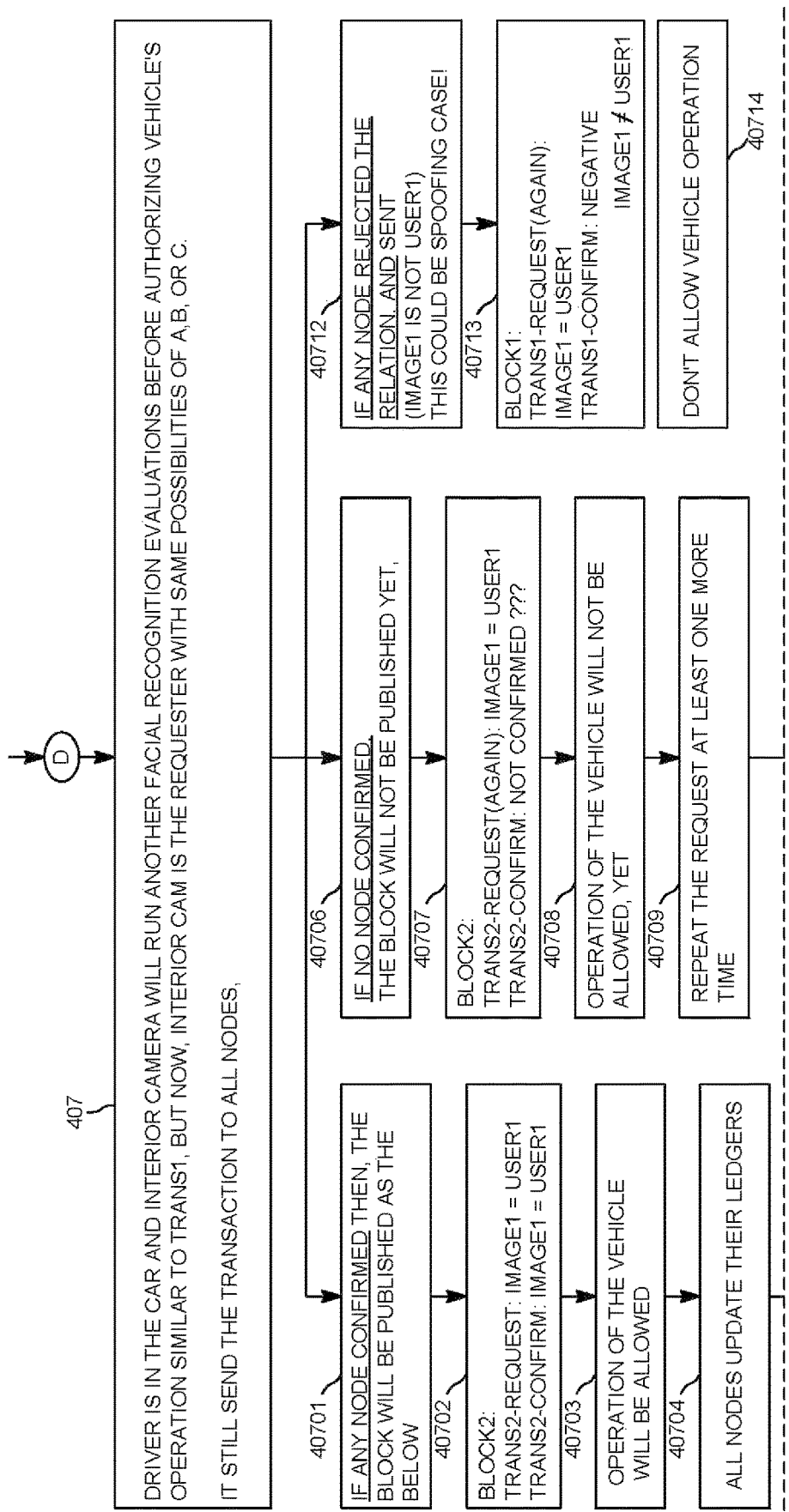

Referring to FIG. 4H, block 407 of FIG. 4A provides that a driver is in vehicle 130, and interior camera 308 runs another facial recognition evaluation before authorizing the operation of vehicle 130 similar to Transaction 1 (Trans1). However, internal camera 308 is the requester with different possibilities, and all transactions are sent to nodes 310-320. Therefore, as indicated blocks 40701block 40712 are the three possibilities. Block 40701 provides that if any conde confirms User1, the block will be publishes as shown in Block 40702:
Block2: Trans2-request: Image1=User1;
Trans2-confirm: Image1=User1.

Next, block 40703 provides that operating vehicle 130 will be allowed. Block 40704 provides that all nodes update their ledgers. Block 40705 provides that when vehicle 130 stops and driver leaves another transaction will be transmitted and confirmed and published similarly to update vehicles 130 location and time, driver's location and time. This information will be used for a next facial recognition.

Block 40706 provides that if no node confirms that a blockchain block will not be published yet. Thus, block 40707 provides:

Block2: Trans2-request (again): Imag1=User1;
Trans2-confirm: Not Confirmed ???.

Block 40708 provides that operating vehicle 130 will not be allowed yet. Block 40709 provides for repeating the request at least one more time.

Figure 4I:
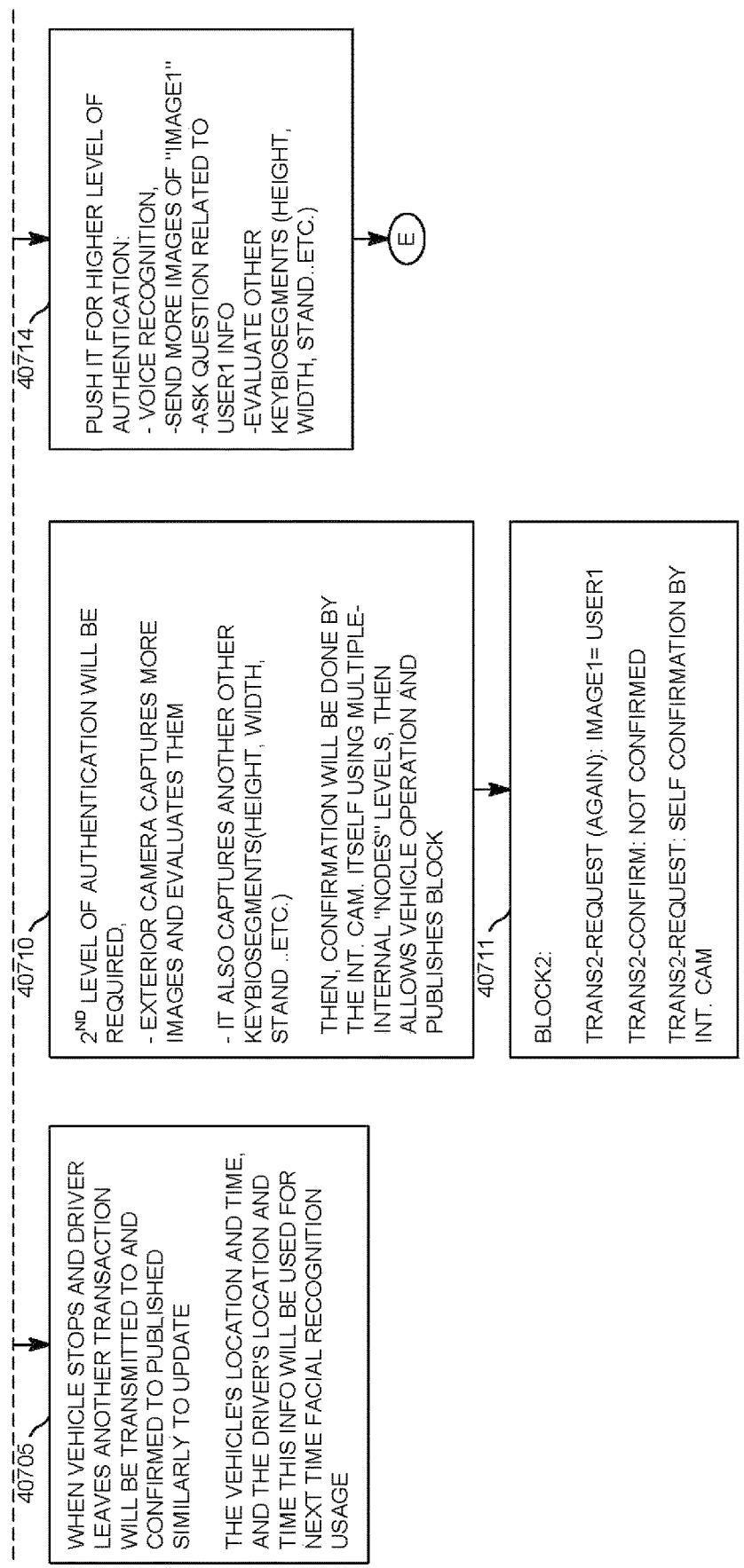

Turning to FIG. 4I, Block 40710 provides for a second, higher level of authentication will be required. Thus, exterior camera 306 captures more images and evaluates them, External camera 306 also captures other biometric data "KeyBioSegments" such as height, width, stand and the like. Then, confirmation will be done by interior camera 308 using multiple internal node levels, which then allows vehicle 130 operation and publishes block2 40711:

Block 2: Trans2-request (again): Image1=User1;
Trans2-confirm: Not confirmed;
Trans2-request: Self Confirmation by Internal Camera.

Block 40712 provides that if any node rejected the relation and sent Image1 is not User1 a spoofing case is suspected. Block 40713 provides:

Block1: Trans1-request (again): Image1=User1;
Trans1-Confirm: Negative Image1 does not equal User1 and vehicle operation is not allowed.

Returning to FIG. 4G, block 40714 provides or pushing for a higher level of authentical with voice recognition, sending of more images of Image1, asking questions related to User1 information and evaluating biometric data, "KeyBioSegments" such as height, width, stand and the like. and proceeding to block 408.

Figure 4J:
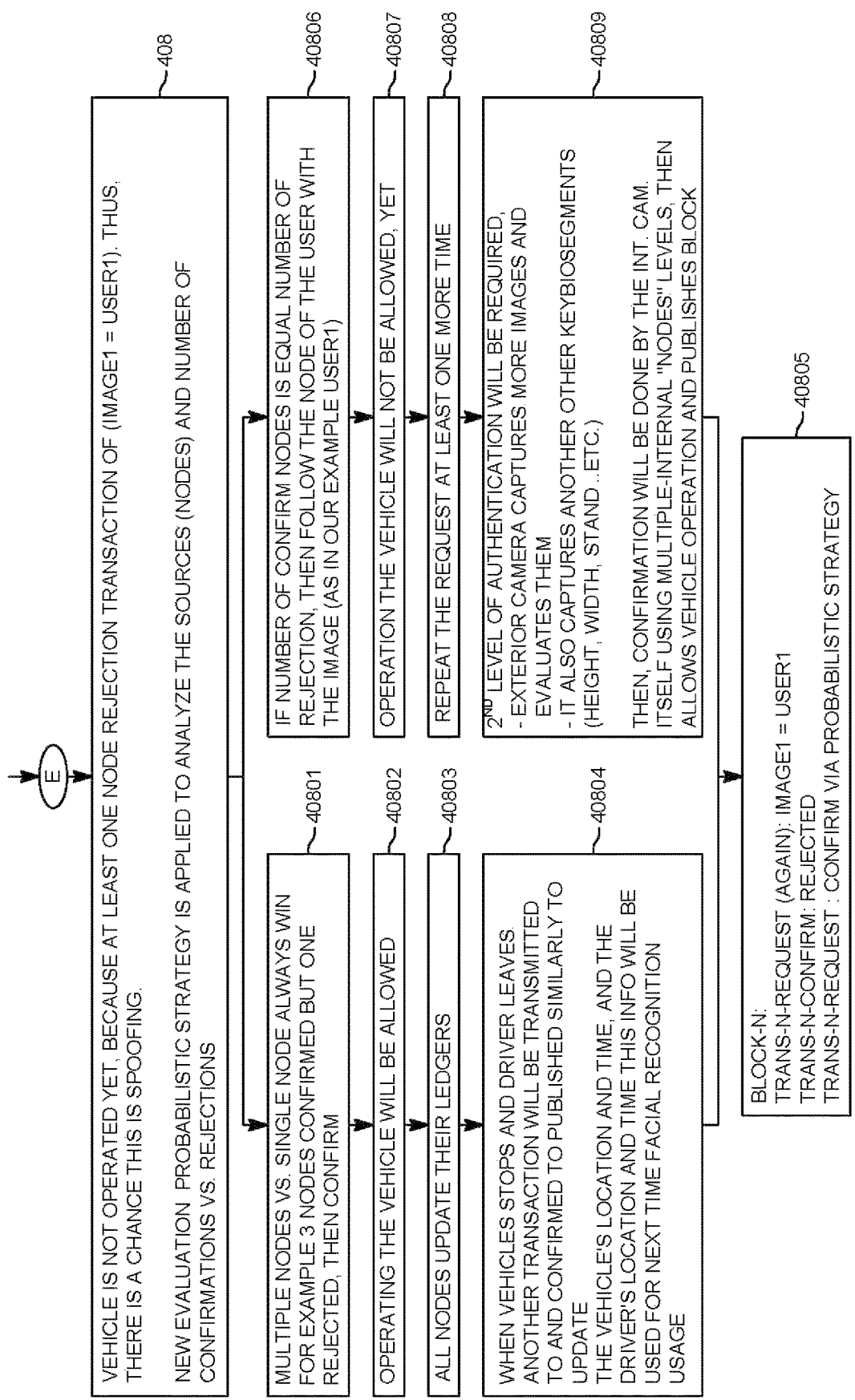

Referring to FIG. 4J, at block 408 of FIG. 4A, vehicle 130 is not operational due to at least one node rejecting a transaction of (Image1=User1), indicating a chance of spoofing is possible. A new evaluation probabilistic strategy is applied to analyze nodes 306-320 and the number of confirmations against the number of rejections. Blocks 40801 or 40806 indicate there are possibilities. At Block 40801, multiple nodes compared against single nodes indicate targeted probability. For example, if three nodes confirm User1 and one rejects, then confirm. Block 40802 provides that operating vehicle 130 is allowed. Block 40803 provides that all nodes update their ledgers. Block 40804 provides that when vehicle 130 stops and driver leaves, another transaction will be transmitted to permissioned blockchain ledger and confirmed to be published similarly to update the vehicle 130 location and time, and the driver's location and time as data for future facial recognition utilization. Next block 40805 provides:

Block-n: Trans-n-request (again): Image1=User1;
Trans-n-confirm: rejected;
Trans-n-request: Confirm via probabilistic strategy.

Referring to block 40806, if the number of confirming nodes is equal to the number of rejections, then follow the node of the user with the image. Thus, block 40807 provides for operating vehicle 130 will not be allowed yet. Block 40808 provides for repeating the request at least one more time. Block 40809 provides for a second, higher level of authentication using exterior camera 306 to capture more images and evaluate them, and to capture other biometric data "KeyBioSegments" such as height, width, stand and the like. Then, confirmation will be done by the internal camera 308 using multiple internal nodes before allowing vehicle 130 to operate. the block is then published in the permissioned blockchain ledger. Next, block 40805 is published as described above for Block-n.

As described above in FIG. 4A, allowing a potential user to access vehicle 130 may not include allowing the potential user to turn on vehicle 130 engine and operate vehicle systems. For example, in exigent circumstances, a potential user may be able to enter vehicle 130 to avoid bad weather or the like. An external camera may be unable to collect proper images due to weather or the like, allow the user to enter and use internal cameras to perform a higher level of authorization prior to enabling vehicle systems. Thus, a "limp mode" may be in place until a higher level of authorization is achieved by a potential user.

Figure 5:
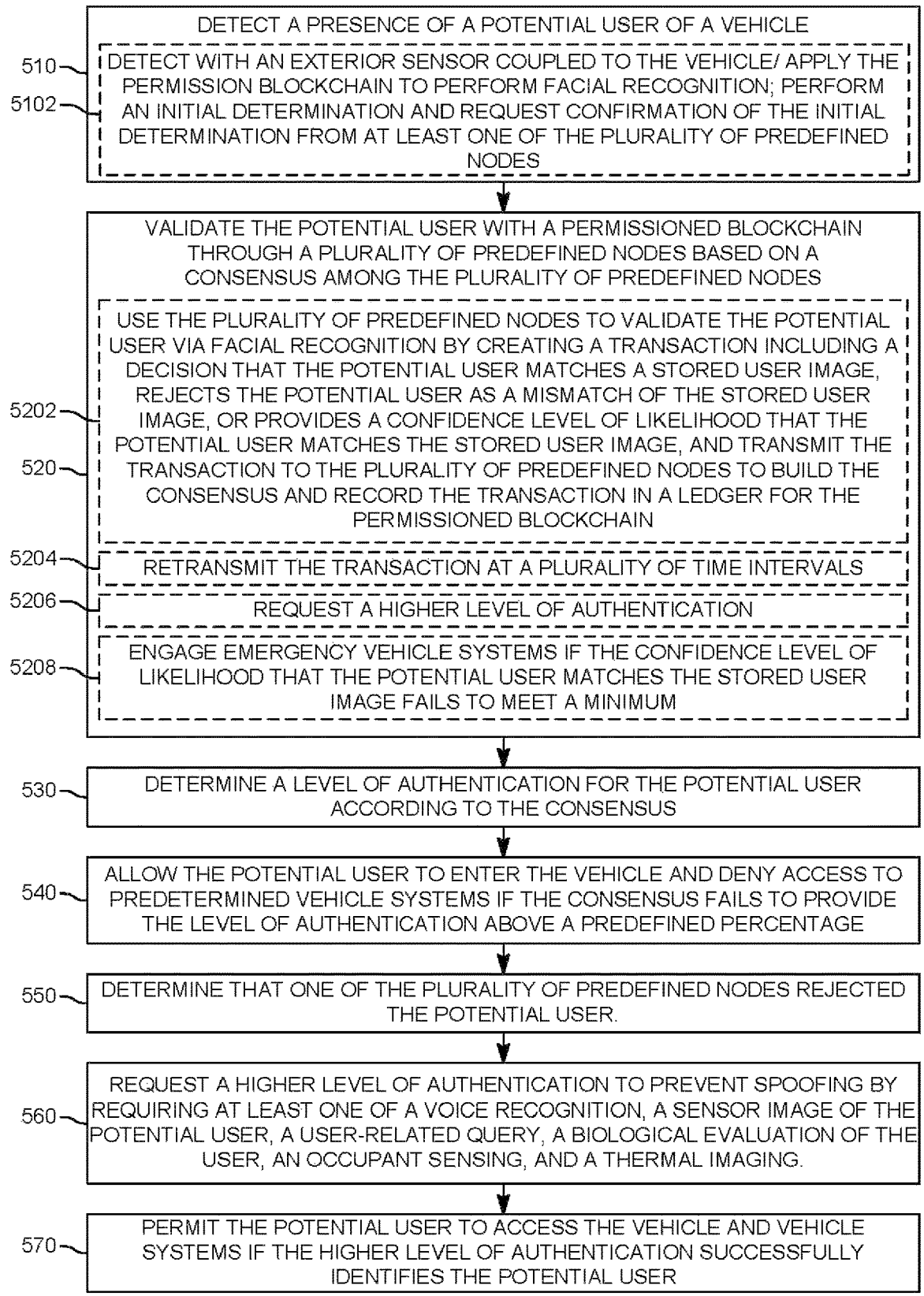
FIG. 5 illustrates a flow diagram of a method in accordance with an embodiment of the disclosure.

Referring now to FIG. 5, a flow diagram illustrates a method in accordance with an embodiment. As shown block 510 provides for detecting a presence of a potential user of a vehicle. For example, potential user may be detected by sensors, such as exterior camera 306 and generate Image1.

Block 510 in some embodiments includes optional block 5102 that provides for detecting with an exterior sensor coupled to the vehicle, applying the permissioned blockchain to perform facial recognition, performing an initial determination, and requesting confirmation of the initial determination from at least one of the plurality of predefined nodes. For example, external camera 306 may take an image of a potential user to compare with a user with facial recognition and make an initial determination and then request confirmation from one of the plurality of nodes 308-320.

Block 520 provides for validating the potential user with a permissioned blockchain through a plurality of predefined nodes based on a consensus among the plurality of predefined nodes. For example, Image1 validation procedure described in FIG. 4A with nodes 306-320 create a consensus by providing that at least one node aside from exterior camera 306 confirm potential user as User1.

Block 520 includes optional block 5202 which provides for using the predefined nodes to validate the potential user via facial recognition by creating a transaction including a decision that the potential user matches a stored user image, rejects the potential user as a mismatch of the stored user image, or provides a confidence level of likelihood that the potential user matches the stored user image, and transmitting the transaction to the predefined nodes to build the consensus and recording the transaction in a ledger for the permissioned blockchain.

Block 520 further includes optional block 5204 which provides for retransmitting the transaction at a plurality of time intervals. For example, in some embodiments, a process may include retransmitting a request for authorization every minute or the like.

Block 520 further includes optional block 5206 which provides for requesting a higher level of authentication. For example, a second authentication may include biometrics, voice recognition and the like as described in FIG. 4A. Block 520 also includes optional block 5208 which provides for engaging emergency vehicle systems if the confidence level of likelihood that the potential user matches the stored user image fails to meet a minimum. For example, emergency vehicle systems may include reference checking.

Block 530 provides for determining a level of authentication for the potential user according to the consensus. For example, the level of authentication may permit potential user to drive vehicle 130 or determine that additional authentication is required and not permit the potential user to operate vehicle 130 but have limited access to vehicle 130. In one or more embodiments, block 530 includes determining the level of authentication includes determining whether to allow the potential user to enter the vehicle, operate the vehicle and operate vehicle equipment, the level of authentication as a function of the consensus. For example, as shown in FIG. 4A block 408, when at least one node 306-320 rejects potential user, there is a chance of spoofing and a probabilistic strategy is applied that compares the number of confirmations against the number of rejections.

Block 540 provides for allowing the potential user to enter the vehicle and denying access to predetermined vehicle systems if the consensus fails to provide the level of authentication above a predefined percentage. For example, as shown in block 407 of FIG. 4A, in some embodiments, further confirmation is required when a potential user gains entry to vehicle 130 but different nodes provide different conclusions about the identity of potential user.

Block 550 provides for determining that one of the plurality of predefined nodes rejected the potential user. For example, if external camera 306 requests confirmation from a node 308-320 and one of the nodes rejects potential user because User1, was located in a different place.

Block 560 provides for requesting a higher level of authentication to prevent spoofing by requiring at least one of a voice recognition, a sensor image of the potential user, a user-related query, a biological evaluation of the user, an occupant sensing, and a thermal imaging. For example, as shown in FIG. 4A, a higher secondary authentication may be required before potential user shown in Image1 is permitted entry or permitted to use vehicle systems. As described with reference to FIG. 4A, biometrics such as height, width and other biometrics may be considered.

Block 570 provides for permitting the potential user to access the vehicle and vehicle systems if the higher level of authentication successfully identifies the potential user. For example, if internal camera 308 satisfies a match between User1 and a potential user.

In one or more embodiments, there could be a determination that none of predefined nodes are able to contribute to the consensus. For example, if all the nodes are unable to confirm an Image1 as shown in FIG. 4A. In such a case, a request to the permissioned blockchain may be repeated and include the higher level of authentication to prevent spoofing by requiring at least one of a voice recognition, a sensor image of the potential user, a user-related query, a biological evaluation of the user, an occupant sensing, and a thermal imaging. For example, potential user may be queried with questions only the User1 in FIG. 4A might know the answer, or biometrics may be measured. Only if the higher level of authentication is successful will the blockchain permit the potential user to access the vehicle and vehicle systems.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," "example implementation," etc., indicate that the embodiment or implementation described may include a particular feature, structure, or characteristic, but every embodiment or implementation may not necessarily include the particular feature, structure, or characteristic. Moreover, such phrases are not necessarily referring to the same embodiment or implementation. Further, when a particular feature, structure, or characteristic is described in connection with an embodiment or implementation, one skilled in the art will recognize such feature, structure, or characteristic in connection with other embodiments or implementations whether or not explicitly described. For example, various features, aspects, and actions described above with respect to an autonomous parking maneuver are applicable to various other autonomous maneuvers and must be interpreted accordingly.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example, but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, mobile devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   detecting a presence of a potential user of a vehicle, using an exterior sensor coupled to the vehicle;
   determining, using the exterior sensor, a negative entry assessment indicating that the potential user is not authorized to use the vehicle;
   validating the potential user with a permissioned blockchain through a plurality of predefined nodes based on a consensus among the plurality of predefined nodes;
   determining that at least one node of the plurality of predefined nodes rejected the negative entry assessment; and
   responsive to the negative entry assessment by the exterior sensor and the rejection of the negative entry assessment by the at least one node:
   allowing the potential user to enter the vehicle and denying access to predetermined vehicle systems;
   determining that the potential user is inside the vehicle;
   performing, using the plurality of predefined nodes, a higher level of authentication to prevent spoofing by requiring at least one of a voice recognition, a sensor image of the potential user, a user-related query, a biological evaluation of the potential user, an occupant sensing, and a thermal imaging; and
   responsive to a confirmation of the higher level of authentication by one or more of the plurality of predefined nodes that the potential user is authorized to use the vehicle, enabling the predetermined vehicle systems.

2. The method of claim 1 wherein the determining the negative entry assessment includes:
   applying the permissioned blockchain to perform facial recognition including:
   performing an initial determination; and
   requesting confirmation of the initial determination from at least one of the plurality of predefined nodes.

3. The method of claim 1 wherein the permissioned blockchain with the plurality of predefined nodes includes exterior and interior sensors, and previously authorized users.

4. The method of claim 1 wherein the validating the potential user with the permissioned blockchain includes:
   using the plurality of predefined nodes to validate the potential user via facial recognition by creating a transaction including a decision that:
   the potential user matches a stored user image;
   rejects the potential user as a mismatch of the stored user image; or
   provides a confidence level of likelihood that the potential user matches the stored user image;
   transmitting the transaction to the plurality of predefined nodes to build the consensus; and
   recording the transaction in a ledger for the permissioned blockchain.

5. The method of claim 4 further comprising:
   retransmitting the transaction at a plurality of time intervals; and
   engaging emergency vehicle systems if a confidence level of likelihood that the potential user matches the stored user image fails to meet a minimum.

6. The method of claim 5 wherein the engaging emergency vehicle systems includes reference checking and contacting authorities.

7. The method of claim 1 further comprising:
determining that none of plurality of predefined nodes are able to contribute to the consensus;
repeating a request to the permissioned blockchain including the higher level of authentication; and
permitting the potential user to access the vehicle and vehicle systems if the higher level of authentication successfully identifies the potential user.

8. A system for a vehicle comprising:
a memory that stores computer-executable instructions;
a processor configured to access the memory and execute the computer-executable instructions to:
detect a presence of a potential user of a vehicle, using an exterior sensor coupled to the vehicle;
determine, using the exterior sensor, a negative entry assessment indicating that the potential user is not authorized to use the vehicle;
validate the potential user with a permissioned blockchain through a plurality of predefined nodes based on a consensus among the plurality of predefined nodes;
determine that at least one node of the plurality of predefined nodes rejected the negative entry assessment;
responsive to the negative entry assessment by the exterior sensor and the rejection of the negative entry assessment by the at least one node:
allow the potential user to enter the vehicle and denying access to predetermined vehicle systems;
determine that the potential user is inside the vehicle;
perform, using the plurality of predefined nodes, a higher level of authentication to prevent spoofing by requiring at least one of a voice recognition, a sensor image of the potential user, a user-related query, a biological evaluation of the potential user, an occupant sensing, and a thermal imaging; and
responsive to a confirmation of the higher level of authentication by one or more of the plurality of predefined nodes that the potential user is authorized to use the vehicle, enable the predetermined vehicle systems.

9. The system of claim 8 wherein the processor is configured to execute instructions to determine the negative entry assessment and further includes instructions to:
apply the permissioned blockchain to perform facial recognition by:
performing an initial determination; and
requesting confirmation of the initial determination from at least one of the plurality of predefined nodes.

10. The system of claim 8 wherein the processor is configured to execute instructions to validate the potential user with the permissioned blockchain includes instructions to:
use the plurality of predefined nodes to validate the potential user via facial recognition by creating a transaction including a decision that:
the potential user matches a stored user image;
rejects the potential user as a mismatch of the stored user image; or
provides a confidence level of likelihood that the potential user matches the stored user image;
transmit the transaction to the plurality of predefined nodes to build the consensus; and
record the transaction in a ledger for the permissioned blockchain.

11. The system of claim 10 wherein the processor configured to execute instructions to validate the potential user with the permissioned blockchain further comprises instructions to:
retransmit the transaction at a plurality of time intervals; and
engage emergency vehicle systems if a confidence level of likelihood that the potential user matches the stored user image fails to meet a minimum.

12. The system of claim 8 wherein the processor is configured to execute instructions further comprises instructions to:
determine that none of the plurality of predefined nodes are able to contribute to the consensus;
repeat a request to the permissioned blockchain including the higher level of authentication; and
permit the potential user to access the vehicle and vehicle systems if the higher level of authentication successfully identifies the potential user.

13. A vehicle comprising:
sensors including exterior cameras and interior cameras;
an on-board computer coupled to the sensors, the on-board computer including a memory and a processor coupled to the memory, the processor configured to access the memory and execute the computer-executable instructions to:
initialize an authentication based on detected presence of a potential user of a vehicle, using an exterior sensor coupled to the vehicle;
determine, using the exterior sensor, a negative entry assessment indicating that the potential user is not authorized to use the vehicle;
validate the potential user with a permissioned blockchain with a plurality of predefined nodes through a consensus among the predefined nodes;
determine that at least one node of the plurality of predefined nodes rejected the negative entry assessment;
responsive to the negative entry assessment by the exterior sensor and the rejection of the negative entry assessment by the at least one node:
allow the potential user to enter the vehicle and deny access to predetermined vehicle systems;
determine that the potential user is inside the vehicle;
perform, using the plurality of predefined nodes, a higher level of authentication to prevent spoofing by requiring at least one of a voice recognition, a sensor image of the potential user, a user-related query, a biological evaluation of the potential user, an occupant sensing, and a thermal imaging; and
responsive to a confirmation of the higher level of authentication by one or more of the plurality of predefined nodes that the potential user is authorized to use the vehicle, enable the predetermined vehicle systems.

14. The vehicle of claim 13 wherein the processor is configured to execute instructions to initialize the authentication based on detected presence of the potential user and further includes instructions to:
detect the potential user with an exterior sensor coupled to the vehicle; and
apply the permissioned blockchain to perform facial recognition by performing an initial determination; and
requesting confirmation of the initial determination from at least one of the plurality of predefined nodes.

15. The vehicle of claim 13 wherein the processor is configured to execute instructions to validate the potential user with the permissioned blockchain includes instructions to:
- use the plurality of predefined nodes to authenticate the potential user via facial recognition by creating a transaction including a decision that the potential user matches a stored image, that rejects the potential user as a mismatch of the stored user image, or that provides a confidence level of likelihood that user matches the stored image;
- transmit the transaction to the plurality of predefined nodes to build the consensus; and
- record the transaction in a ledger for the permissioned blockchain.

* * * * *